US012330867B2

(12) United States Patent
Hasirumane Srikantegowda

(10) Patent No.: US 12,330,867 B2
(45) Date of Patent: Jun. 17, 2025

(54) GESTURE BASED TOUCHLESS LAVATORY WASTE FLAP ACTUATION

(71) Applicant: B/E Aerospace, Inc., Winston Salem, NC (US)

(72) Inventor: Avinash Hasirumane Srikantegowda, Mukilteo, WA (US)

(73) Assignee: B/E AEROSPACE, INC., Winston Salem, NC (US)

( * ) Notice: Subject to any disclaimer, the term of this patent is extended or adjusted under 35 U.S.C. 154(b) by 84 days.

(21) Appl. No.: 18/191,804

(22) Filed: Mar. 28, 2023

(65) Prior Publication Data
US 2024/0327114 A1  Oct. 3, 2024

(51) Int. Cl.
*B65F 1/16* (2006.01)
*B64D 11/02* (2006.01)

(52) U.S. Cl.
CPC ........... *B65F 1/1638* (2013.01); *B64D 11/02* (2013.01); *B65F 2210/168* (2013.01)

(58) Field of Classification Search
CPC .............. B65F 1/1638; B65F 2210/168; B65F 1/1431; B64D 11/02; E05Y 2999/00; E05F 15/73; E05F 15/74
See application file for complete search history.

(56) References Cited

U.S. PATENT DOCUMENTS

| | | | | |
|---|---|---|---|---|
| 5,361,913 A | * | 11/1994 | Melchionna | G07F 7/0609 209/583 |
| 6,425,487 B1 | * | 7/2002 | Emmott | B07C 7/00 209/703 |
| 7,741,801 B2 | | 6/2010 | Fukuizumi | |
| 2002/0108507 A1 | * | 8/2002 | May | B65F 1/1638 700/229 |
| 2004/0195309 A1 | * | 10/2004 | Wagner | B65F 1/004 235/375 |
| 2005/0281653 A1 | * | 12/2005 | Channel | B62B 5/0026 414/498 |

(Continued)

FOREIGN PATENT DOCUMENTS

CN    110466912    8/2023
WO    2019228594   12/2019

OTHER PUBLICATIONS

European Patent Office, European Search Report dated Jul. 17, 2024 in Application No. 24167590.9.

*Primary Examiner* — Kareen K Thomas
(74) *Attorney, Agent, or Firm* — SNELL & WILMER L.L.P.

(57) ABSTRACT

A method is disclosed herein. The method includes sending a first signal to a first emitter in an aircraft lavatory to activate the first emitter, the first emitter illuminating an object with infrared light, receiving a second signal from a first sensor in the aircraft lavatory, the second signal providing an indication of motion of the object based on a first reflection from the object, receiving a third signal from a second sensor in the aircraft lavatory, the third signal providing an indication of motion of the object based on a second reflection from the object, determining that the object is moving in a vertical direction based on the second signal and the third signal, and activating an actuator in response to the determining that the object is moving in the vertical direction, the actuator coupled to a waste bin flap that opens into a wall of the aircraft lavatory.

6 Claims, 5 Drawing Sheets

(56) References Cited

U.S. PATENT DOCUMENTS

2006/0255033 A1* 11/2006 Yang .................... B65F 1/1638
                                                              220/211
2017/0073158 A1    3/2017  Yang et al.
2021/0331800 A1   10/2021  Dhanapal
2022/0001986 A1    1/2022  Burd et al.
2022/0160126 A1    5/2022  Yang et al.
2022/0306296 A1    9/2022  Edquist et al.

* cited by examiner

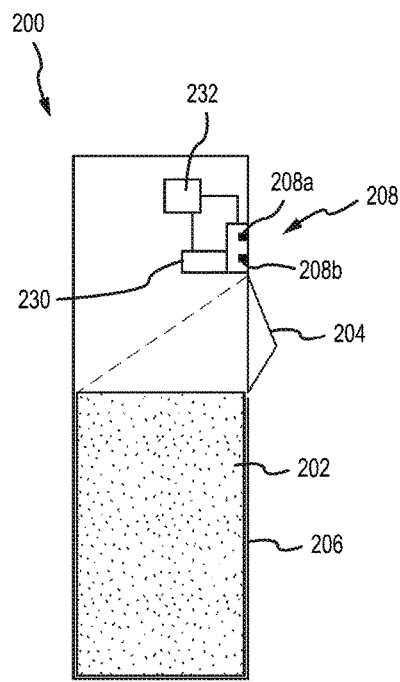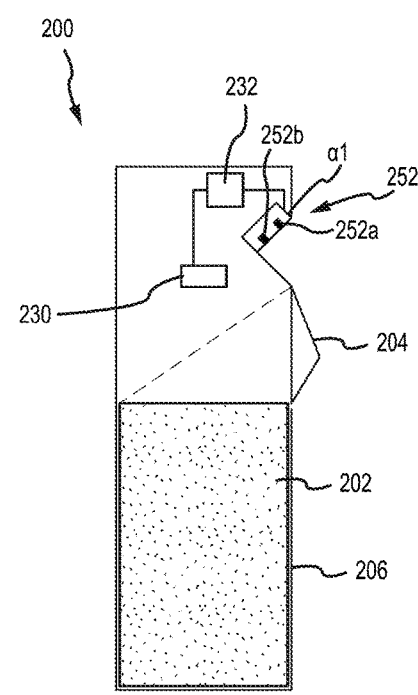
FIG. 2B
FIG. 2C

GESTURE BASED TOUCHLESS LAVATORY WASTE FLAP ACTUATION

FIELD

The present disclosure generally relates aircraft lavatories, and more specifically, to touchless actuation of lavatory waste flap.

BACKGROUND

Sensors are increasingly being used in lavatories onboard aircraft to control various operations within the lavatories. At the same time aircraft lavatory space is shrinking and the lavatories are more congested so that any movement within the lavatory may inadvertently trigger various operations, including the flap of the waste bin in the lavatory. This unnecessary actuation of the waste bin flap, though harmless, is a nuisance and may increase maintenance time and cost.

SUMMARY

A method is disclosed herein. The includes sending, by a processor, a first signal to a first emitter in an aircraft lavatory to activate the first emitter, the first emitter illuminating an object with infrared light, receiving, by the processor, a second signal from a first sensor in the aircraft lavatory, the second signal providing an indication of motion of the object based on a first reflection from the object, receiving, by the processor, a third signal from a second sensor in the aircraft lavatory, the third signal providing an indication of motion of the object based on a second reflection from the object, determining, by the processor, that the object is moving in a vertical direction based on the second signal and the third signal, and activating, by the processor, an actuator in response to the determining that the object is moving in the vertical direction, the actuator coupled to a waste bin flap and configured to open the waste bin flap into a wall of the aircraft lavatory.

In various embodiments, the first emitter, the first sensor, and the second sensor are disposed above the waste bin flap. In various embodiments, the second signal is received at a first time, the third signal is received at a second time, and the determining the object is moving in the vertical direction is further based on the second time being after the first time. In various embodiments, sending, by the processor, a fourth signal to the first emitter to deactivate the first emitter, sending, by the processor, a fifth signal to a second emitter to activate the second emitter, and determining, by the processor, that the object is moving in the vertical direction based on the second signal, the third signal, and a state of the first emitter and the second emitter.

In various embodiments, the first sensor is disposed above the second sensor. In various embodiments, the method further includes determining, by the processor, that the second signal was received before the third signal. In various embodiments, the method further includes determining, by the processor, that the first reflection is greater than the second reflection.

Also disclosed herein is an aircraft lavatory including a floor, a wall extending vertically from the floor, a waste bin disposed behind the wall, a flap disposed within the wall and configured to provide access to the waste bin, an actuator coupled to the flap and configured to open the flap, a sensor assembly including a first emitter, a first sensor, and a second sensor, a processor coupled to the actuator and the sensor assembly, and a memory operatively coupled to the processor. The memory includes instructions stored thereon that, when executed by the processor, cause the processor to activate the first emitter to illuminate an object adjacent the wall, receive an indication motion of the object from the sensor assembly, the indication of motion based at least in part on the first sensor and the second sensor, and activate the actuator in response to the indication of motion being in a first direction, the first direction being parallel to the wall.

In various embodiments, the first direction is a downward direction toward the floor. In various embodiments, the sensor assembly is angled with respect to the wall and toward the floor. In various embodiments, the instructions, when executed by the processor, further cause the processor to activate the actuator in response to the indication of motion being in a second direction, the second direction being angled toward the wall with respect to the first direction.

In various embodiments, the instructions, when executed by the processor, further cause the processor to receive a first signal from the first sensor, the first signal indicating a first reflection strength from the object, receive a second signal from the second sensor, the second signal indicating a second reflection strength from the object, and determine the second direction in response to the first reflection strength being greater than the second reflection strength.

In various embodiments, the sensor assembly further includes a second emitter, wherein the instructions, when executed by the processor, further cause the processor to alternate the sensor assembly between a first state and a second state, wherein in the first state the first emitter is activated and the second emitter deactivated, and wherein in the second state the first emitter is deactivated and the second emitter is activated, and determine that the motion is in the first direction in response to the sensor assembly being in the first state. In various embodiments, the sensor assembly is disposed in the wall and above the flap.

Also disclosed herein is a waste bin actuation system including a wall including an opening, a waste bin disposed behind the wall, a flap disposed within the opening and configured to provide access to the waste bin, an actuator coupled to the flap, a sensor assembly disposed in the wall, the sensor assembly including a first emitter, a first sensor, and a second sensor, a processor operatively coupled to the actuator and the sensor assembly, and a memory operatively coupled to the processor. The memory comprising instructions stored thereon that, when executed by the processor, cause the processor to activate the first emitter to transmit an infrared light onto a moving object, receive a first signal from the first sensor, receive a second signal from the second sensor, and activate the actuator in response to the receiving the first signal before the second signal.

In various embodiments, the first signal indicates a first amount of infrared reflection from an object, wherein the second signal indicates a second amount of infrared reflection from the object, and wherein the instructions, when executed by the processor, further cause the processor to In various embodiments, determine a first amount of infrared light based on the first signal, determine a second amount of infrared light based on the second signal, determine that the object the object is moving in a first direction based at least in part on the first amount of infrared light and the second amount of infrared light, and activate the actuator in response to the object moving in the first direction.

In various embodiments, the sensor assembly further includes a second emitter, wherein the instructions, when executed by the processor, further cause the processor to alternately activate the first emitter and the second emitter, and determine that the motion is in the first direction based at least in part on the first emitter being activated. In various embodiments, the sensor assembly is angled away from the wall, and wherein the instructions, when executed by the processor, further cause the processor to activate the actuator in response to the first amount of infrared light being within a predetermined amount of the second amount of infrared light, indicating in a second direction that is angled toward the sensor assembly with respect to the first direction.

In various embodiments, the first sensor is disposed above the second sensor. the first signal being received before the second signal indicates a downward motion from the first sensor to the second sensor.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

FIGS. 2A, 2B, and 2C illustrate various views of a waste bin and associated components, in accordance with various embodiments.

DETAILED DESCRIPTION

Figure 1:
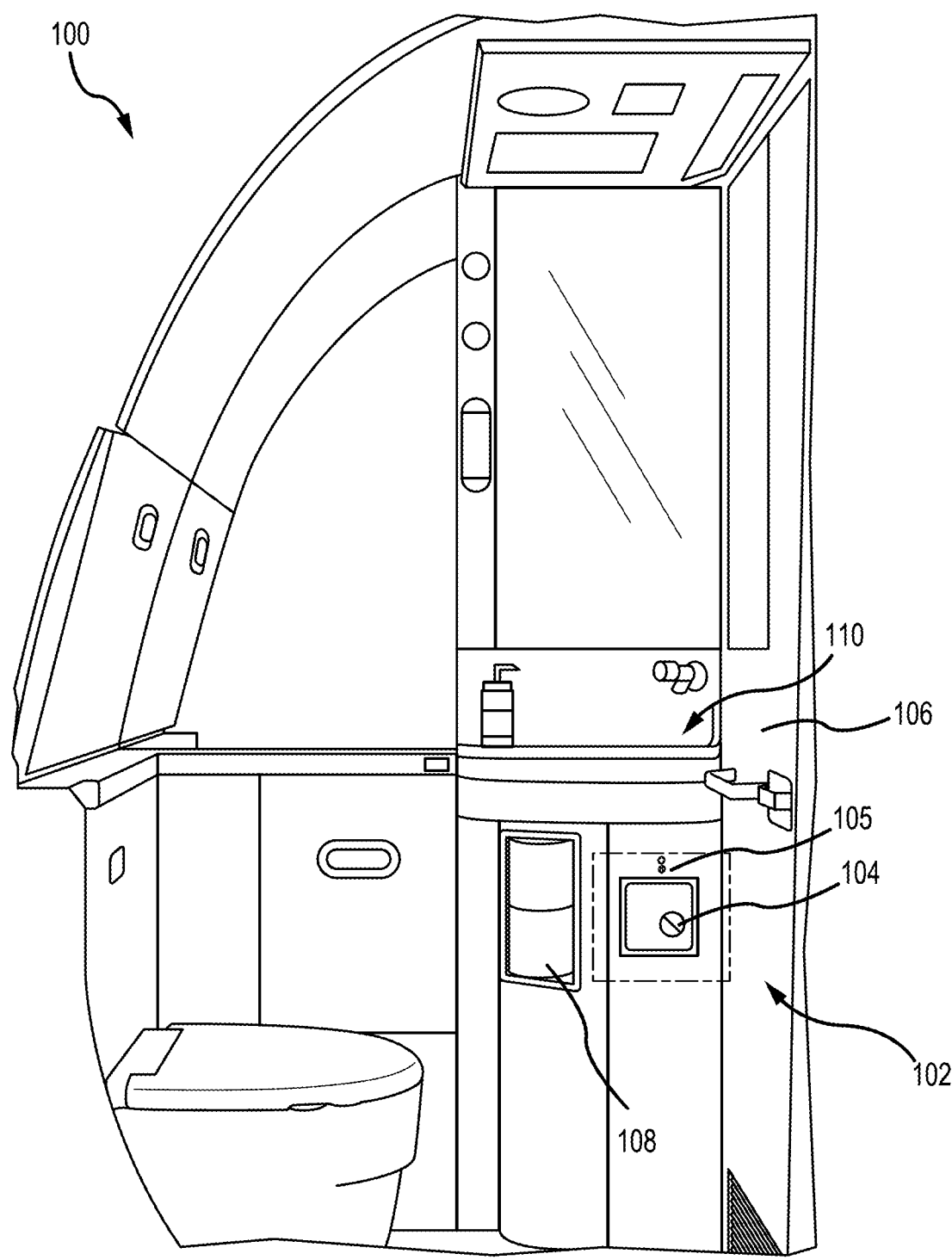
FIG. 1 illustrates an exemplary aircraft lavatory, in accordance with various embodiments.

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. While these exemplary embodiments are described in sufficient detail to enable those skilled in the art to practice the invention, it should be understood that other embodiments may be realized and that logical, chemical and mechanical changes may be made without departing from the spirit and scope of the invention. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Disclosed herein is a aircraft lavatory waste bin flap actuation system. The waste bin flap actuation system includes, in various embodiments, a waste bin flap, an actuator a controller, an infrared (IR) emitter, and an IR motion sensor. In various embodiments, the actuator may be coupled to the controller and the waste bin flap. In various embodiments, the actuation system may include a plurality of IR emitters that may be arranged in various configurations. In various embodiments, the actuation system may include a plurality of IR sensors that may be arranged in various configurations. In various embodiments, the actuation system may include a plurality of IR motions sensors that may be arranged in various configurations. In various embodiments, the controller is coupled to and controls the plurality of IR emitters and the plurality of motion sensors. In various embodiments, the actuation system may distinguish between a downward motion (e.g., top to bottom) and a motion to the left or to the right. In various embodiments, the actuation system may distinguish between an angled downward motion and a straight downward motion. The actuation system disclosed herein may reduce the number of times a waste bin flap is actuated and may thereby lengthen the useable lifespan of the waste bin flap and actuator.

Referring now to FIG. 1, an exemplary aircraft lavatory 100 is illustrated, in accordance with various embodiments. Aircraft lavatory 100 includes a waste bin 102, a bin flap 104, one or more sensors 105, and a door 106. The bin flap 104 may be configured to open in response to a signal from the one or more sensors 105. Aircraft lavatory 100 further includes wipes and/or paper towels illustrated as wipes 108 and a sink 110. A passenger may enter aircraft lavatory 100 using door 106. The passenger may use sink 110, dry their hands using wipes 108, and throw wipes 108 in trash can 102 by actuating bin flap 104 using the one or more sensors 105. In various embodiments, bin flap 104 may be configured to actuate in response to the one or more sensors 105 providing an indication of downward motion (e.g., in the negative z-direction). That is, as the passenger enters aircraft lavatory 100, uses sink 110, and exits aircraft lavatory 100, the one or more sensors 105 register the motion of the passenger. However, as will be described in further detail below, bin flap 104 may be configured to ignore motion that is not downward (e.g., in the negative z-direction). That is, the passenger moving left to right (e.g., in the positive x-direction), right to left (e.g., in the negative x-direction), or bottom to top (e.g., in the positive z-direction) may not actuate bin flap 104.

Figure 2A:
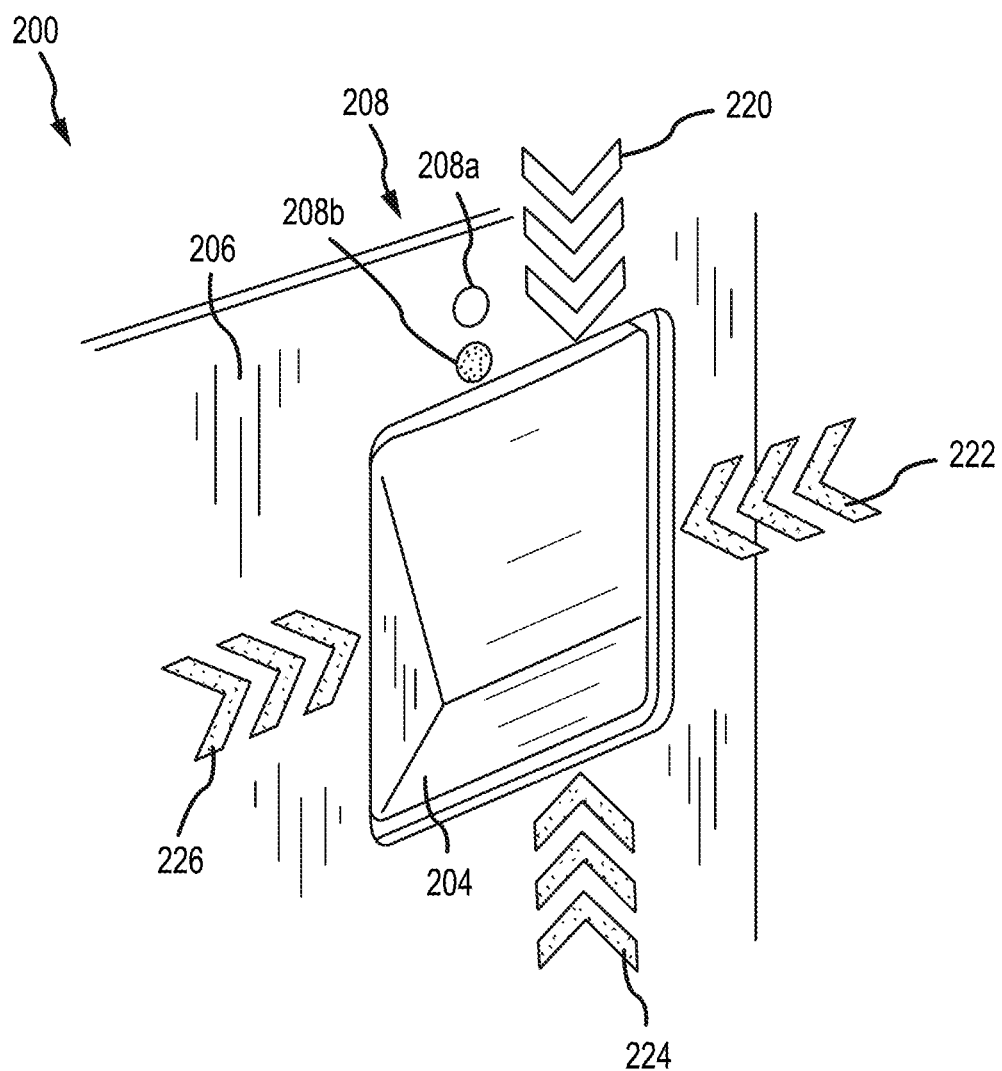
Figure 2A:
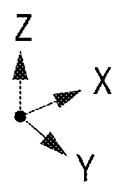

Referring now to FIGS. 2A-2C, illustrated are a waste bin flap actuation system 200 and a waste bin flap actuation system 250, in accordance with various embodiments. FIG. 2A illustrates a close up perspective view of waste bin flap actuation system 200, in accordance with various embodiments. FIG. 2B illustrates a side view of waste bin flap actuation system 200, in accordance with various embodiments. FIG. 2C illustrates a side view of waste bin flap actuation system 250, in accordance with various embodiments. Waste bin flap actuation system 200 and waste bin flap actuation system 250 may be examples of waste bin 102 described above with respect to aircraft lavatory 100 in FIG. 1.

Referring now to FIGS. 2A and 2B, waste bin flap actuation system 200 includes a waste bin 202, a flap 204, a wall 206, a sensor assembly 208, an actuator 230, and a controller 232. Wall 206 may be the wall of aircraft lavatory 100 behind which waste bin 202 is located. Flap 204 may be surrounded by wall 206 and provide access to waste bin 202. Flap 204 is configured to rotate into wall 206 (e.g., in the negative y-direction) to expose waste bin 202. Actuator 230 may be located behind wall 206 and is coupled to flap 204. Actuator 230 is further coupled to controller 232 and is configured to move, or rotate, flap 204 in response a signal from controller 232.

Sensor assembly 208 is coupled to controller 232 and, in various embodiments, sensor assembly 208 is located above flap 204 (e.g., in the positive z-direction) as illustrated in FIGS. 2A and 2B. In various embodiments, sensor assembly 208 may be located in different positions with respect to flap 204, such as for example, to either side of flap 204, below flap 204, or on a different wall in aircraft lavatory 100, among others. In the embodiment illustrated in FIG. 2A, sensor assembly 208 includes two discrete sensors, a first sensor 208a and a second sensor 208b, with first sensor 208a located above second sensor 208b (e.g., in the positive z-direction). In various embodiments, first sensor 208a and/or second sensor 208b may each include an infrared (IR) emitter and an IR sensor. In various embodiments, the IR emitter and IR sensor work with a wavelength of about 0.75 μm to about 3 μm. The IR emitter may transmit an IR signal and the IR sensor may receive a reflection of the IR signal off a nearby object (e.g., a body, a hand, etc.). First sensor 208a and second sensor 208b may use the IR reflection to identify movement of the object.

In the embodiment illustrated in FIG. 2B, sensor assembly 208 is mounted within and flush with wall 206. In various embodiments, sensor assembly 208 may include a plurality of IR emitters and a plurality of IR sensors. It should be understood that the plurality of IR emitters and the plurality of IR sensors housed by sensor assembly 208 may be arranged in various configurations and that the various configurations are within the scope of this disclosure. Various configurations of sensor assembly 208 and the position of the plurality of IR emitters and the plurality of IR sensors will be discussed further below with respect to FIGS. 3A-3D.

In various embodiments, sensor assembly 208 may be an IR motion sensor that is configured to identify motion but not a range, or distance, to the moving object. Sensor assembly 208 transmits one or more signals (e.g., from first sensor 208a and second sensor 208b) to controller 232. Controller 232 is configured to receive the signals from sensor assembly 208 and determine whether a user (e.g., a passenger) intended to activate flap 204 of waste bin 202. Due to the tight confines of the lavatory (e.g., aircraft lavatory 100), waste bin flap actuation system 200, and more specifically, controller 232 may receive many signals from sensor assembly 208 while the lavatory is in use by the passenger. In various embodiments, controller 232 is configured to activate actuator 230 in response to a signal from sensor assembly 208 indicating a top to bottom motion (e.g., moving from the positive z-direction toward the negative z-direction) and ignore all other indications of motion.

In various embodiments, controller 232 receives one or more signals from sensor assembly 208 (e.g., first sensor 208a and second sensor 208b). Controller 232 may interpret the signals from sensor assembly 208 as movement downward (e.g., in the negative z-direction) as indicated by chevrons 220, as movement to the left (e.g., in the negative x-direction) as indicated by chevrons 222, as movement upward (e.g., in the positive z-direction) as indicated by chevrons 224, and movement to the right (e.g., in the positive x-direction) as indicated by chevrons 226. Controller 232 may actuate flap 204, and more specifically, actuator 230 in response to determining that the movement indicated by sensor assembly 208 is downward (e.g., chevrons 220, in the negative z-direction). In various embodiments, controller 232 may identify the motion as downward movement in response to receiving a first signal from first sensor 208a first, as it is above second sensor 208b (e.g., in the positive z-direction), and then receiving a second signal from second sensor 208b. In various embodiments, controller 232 may ignore movement to the left, upward, and to the right (e.g., chevrons 222, 224, 226, respectively). Controller 232 may identify upward movement in response to receiving a first signal from second sensor 208b first, as it is below first sensor 208a (e.g., in the negative z-direction), and then receiving a second signal from first sensor 208a. In various embodiments, controller may or may not be able to identify movement to the left and/or right based on the location of sensor assembly 208, and more specifically, the configuration of the plurality of IR emitters and IR receivers within sensor assembly 208.

Controller 232 may comprise one or more processors configured to implement various logical operations in response to execution of instructions, for example, instructions stored on a non-transitory, tangible, computer-readable medium. The one or more processors can be a general purpose processor, a microprocessor, a microcontroller, a digital signal processor (DSP), an application specific integrated circuit (ASIC), a field programmable gate array (FPGA) or other programmable logic device, discrete or transistor logic, discrete hardware components, or any combination thereof. Controller 232 may further comprise memory to store data, executable instructions, system program instructions, and/or controller instructions to implement the control logic of controller 232.

System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se.

Referring now to FIG. 2C, waste bin flap actuation system 250 includes similar components to those previously described with respect to waste bin flap actuation system 200 in FIGS. 2A and 2B including waste bin 202, flap 204, wall 206, waste bin 210, actuator 230, and controller 232. Waste bin flap actuation system 250 further includes sensor assembly 252 that is mounted to wall 206 at an angle α1 from vertical (e.g., the z-axis). In various embodiments, α1 may be about 25° to about 70°, and more specifically, about 35° to about 55°. Sensor assembly 252 may include a plurality of IR emitters and a plurality of IR sensors.

In various embodiments, sensor assembly 252 includes a first sensor 252a and a second sensor 252b. First sensor 252a may be located above and to the right of second sensor 252b (e.g., in the positive z-direction and the positive y-direction, respectively) as depicted in FIG. 2C. In various embodiments, mounting sensor assembly 252 at angle α1 may reduce the number of unintentional actuations of flap 204. In various embodiments, controller 232 may receive the one or more signals from sensor assembly 252 and distinguish between downward motion (e.g., a hand in the negative z-direction) and motion that is downward and toward wall 206 (e.g., in the negative z-direction and the negative y-direction, respectively). For example, first sensor 252a may receive more IR light, resulting in a larger signal, than second sensor 252b in response to an object moving straight down (e.g., parallel to the z-axis in the negative z-direction). Second sensor 252b may receive a similar amount of IR light as first sensor 252a in response to the object moving down and toward wall 206 (e.g., in the negative z-direction and the negative y-direction). Accordingly, in various embodiments, controller 232 may activate actuator 230 to open flap 204 in response to the object moving down and toward wall 206 and not in response to the object moving straight down.

Referring now to FIGS. 3A-3D, a sensor assembly 300, a sensor assembly 330, a sensor assembly 350, and a sensor assembly 370 are illustrated, in accordance with various embodiments. In various embodiments, sensor assemblies 300, 330, 350, 370 may be an example of sensor assembly 208. In various embodiments, sensor assemblies 300, 330, 350, 370 may be an example of sensor assembly 252. In various embodiments, sensor assemblies 300, 330, 350, 370 may be coupled to and in communication with a controller (e.g., controller 232). In various embodiments, controller 232 may send instructions to and receive readings from sensor assemblies 300, 330, 350, 370. In various embodiments, each sensor assembly 300, 330, 350, 370 may include an integrated controller that communicates with controller 232. Controller 232 will be referenced below for ease of description and consistency. It should be appreciated that the embodiments described herein are not intended to be limited but are exemplary and for description purposes.

Figure 3A:
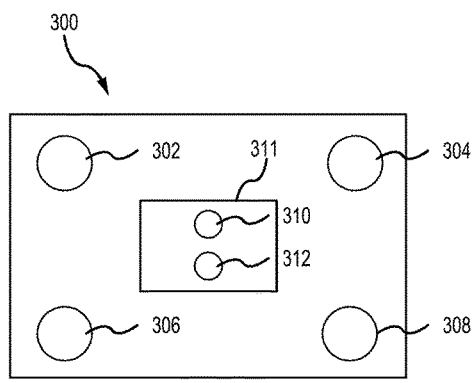
FIGS. 3A, 3B, 3C, and 3D illustrate emitter and sensor configurations, in accordance with various embodiments.

Referring to FIG. 3A, sensor assembly 300 includes a first infrared (IR) emitter 302, a second IR emitter 304, a third IR emitter 306, a fourth IR emitter 308, a first IR sensor 310, and a second IR sensor 312. First IR emitter 302 may be located in an upper-left corner (e.g., in the positive z-direction and the negative x-direction) of sensor assembly 300. Second IR emitter 304 may be located in an upper-right corner (e.g., in the positive z-direction and the positive x-direction) of sensor assembly 300. Third IR emitter 306 may be located in a lower-left corner (e.g., in the negative z-direction and the negative x-direction) of sensor assembly 300. Fourth IR emitter 308 may be located in a lower-right corner (e.g., in the negative z-direction and the positive x-direction) of sensor assembly 300. First IR sensor 310 may be centered between the left and right side (e.g., along the x-axis) of a sensor boundary 311 and above second IR sensor 312 (e.g., in the positive z-direction). Second IR sensor 312 may be centered between the left and right side (e.g., along the x-axis) of sensor boundary 311 and below first IR sensor 310 (e.g., in the negative z-direction).

IR emitters 302, 304, 306, 308 emit an IR light into an lavatory (e.g., aircraft lavatory 100). IR sensors 310, 312 receive IR light that is reflected off an object (e.g., a passenger) in the lavatory. Sensor assembly 300 provides an indication of motion to controller 232 in response to IR sensors 310, 312 receiving the reflected IR light from the object. In various embodiments, IR emitters 302, 304, 306, 308 may be independently controlled. That is, each IR emitter 302, 304, 306, 308 may be turned on and turned off independently of each of the other IR emitters 302, 304, 306, 308. In various embodiments, IR sensors 310, 312 each transmit a signal to controller 232 indicating an amount of IR light reflection received. In various embodiments, sensor assembly 300 may receive signals from IR sensors 310, 312 and transmit an indication of direction of motion to controller 232.

In various embodiments, IR emitters 302, 304, 306, 308 may be timed to alternate turning on and turning off. In various embodiments, controller 232 may control the timing of the sequence of IR emitters 302, 304, 306, 308. In various embodiments, the timing may about 0.1 ms to about 4 ms, and more specifically, about 1 ms to about 2 ms. An exemplary timing sequence may include turning on first IR emitter 302, turning off first IR emitter 302 after 1 ms, turning on second IR emitter 304, turning off second IR emitter 304 after 1 ms, turning on second IR emitter 306, turning off second IR emitter 306 after 1 ms turning on second IR emitter 308, turning off second IR emitter 308 after 1 ms, and repeating the sequence.

First IR sensor 310 and second IR sensor 312 may receive IR light reflected off an object (e.g., the passenger) and transmit a signal indicating an amount of receive IR light to controller 232. Controller 232 may determine a directionality of the motion based on the timing sequence of IR emitters 302, 304, 306, 308 and signals from IR sensors 310, 312. As an example, controller 232 may determine that the motion is downward (e.g., in the negative z-direction) in response to receiving a signal from first IR sensor 310 before receiving a signal from second IR sensor 312. As an example, controller 232 may determine that the motion is to the right (e.g., in the positive x-direction) in response an increase in signal strength from first IR sensor 310 and/or second IR sensor 312 during the timer period that second IR emitter 304 is turned on.

Figure 3B:
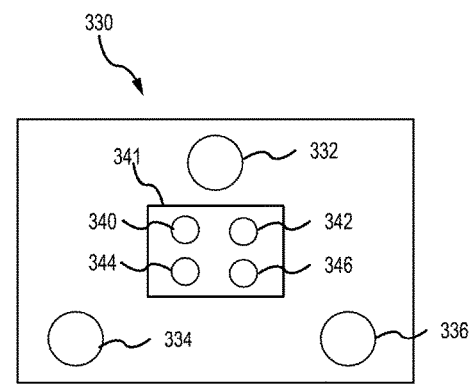

Referring now to FIG. 3B, sensor assembly 330 may include similar components as sensor assembly 300 described above in FIG. 3A, including a first infrared (IR) emitter 332, a second IR emitter 334, a third IR emitter 336, a first IR sensor 340, and a second IR sensor 342, descriptions of which may not be repeated below. Sensor assembly 330 further includes a third IR sensor 344 and a fourth IR sensor 346.

First IR emitter 332 may be centered (e.g., along the x-axis) within and toward the top (e.g., in the positive z-direction) of sensor assembly 330. Second IR emitter 3334 may be located in a lower-left corner (e.g., in the negative z-direction and the negative x-direction) of sensor assembly 330. Third IR emitter 336 may be located in a lower-right corner (e.g., in the negative z-direction and the positive x-direction) of sensor assembly 330. First IR sensor 340 may be located in an upper-left corner (e.g., in the positive z-direction and the negative x-direction) of a sensor boundary 341. Second IR sensor 342 may be located in an upper-right corner (e.g., in the positive z-direction and the positive x-direction) of sensor boundary 311. Third IR sensor 344 may be located in a lower-left corner (e.g., in the negative z-direction and the negative x-direction) of a sensor boundary 341. Fourth IR sensor 346 may be located in a lower-right corner (e.g., in the negative z-direction and the positive x-direction) of sensor boundary 311.

Similar to sensor assembly 300, controller 232 may control a timing sequence of IR emitters 332, 334, 336 and receive signals from IR sensors 340, 342, 344, 346. In various embodiments, controller 232 may determine a directionality of movement based on the timing sequence of IR emitters 332, 334, 336 and the signals received from IR sensors 340, 342, 344, 346. In various embodiments, the signals sent by IR sensors 340, 342, 344, 346 may indicate an intensity of the IR reflection received.

Figure 3C:
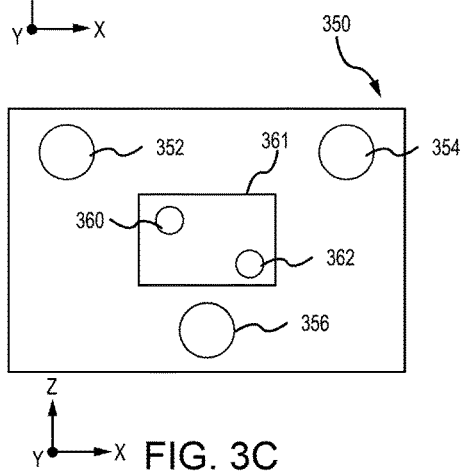

Referring now to FIG. 3C, sensor assembly 350 may include similar components as sensor assembly 300 described above in FIG. 3A, including a first infrared (IR) emitter 352, a second IR emitter 354, a third IR emitter 356, a first IR sensor 360, and a second IR sensor 362, descriptions of which may not be repeated below.

First IR emitter 352 may located in an upper-left corner (e.g., in the positive z-direction and the negative x-direction) of sensor assembly 350. Second IR emitter 354 may be located in an upper-right corner (e.g., in the positive z-direction and the positive x-direction) of sensor assembly 350. Third IR emitter 336 may be centered (e.g., along the x-axis) within and toward the bottom (e.g., in the negative z-direction) of sensor assembly 350. First IR sensor 360 may be located in an upper-left corner (e.g., in the positive z-direction and the negative x-direction) of a sensor boundary 361. Second IR sensor 362 may be located in a lower-right corner (e.g., in the negative z-direction and the positive x-direction) of sensor boundary 361.

Similar to sensor assembly 300, controller 232 may control a timing sequence of IR emitters 352, 354, 356 and receive signals from IR sensors 360, 362. In various embodiments, controller 232 may determine a directionality of movement based on the timing sequence of IR emitters 352, 354, 56 and the signals received from IR sensors 360, 362. In various embodiments, the signals sent by IR sensors 360, 362 may indicate an intensity of the IR reflection received.

Figure 3D:
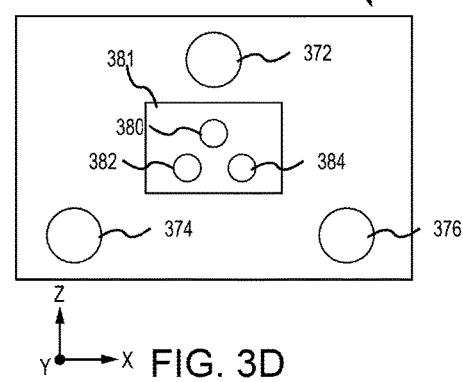

Referring now to FIG. 3D, sensor assembly 370 may include similar components as sensor assembly 300 described above in FIG. 3A, including a first infrared (IR) emitter 352, a second IR emitter 354, a third IR emitter 356, a first IR sensor 360, and a second IR sensor 362, descriptions of which may not be repeated below.

First IR emitter 372 may be centered (e.g., along the x-axis) within and toward the top (e.g., in the positive z-direction) of sensor assembly 370. Second IR emitter 374 may be located in a lower-left corner (e.g., in the negative z-direction and the negative x-direction) of sensor assembly 370. Third IR emitter 376 may be located in a lower-right corner (e.g., in the negative z-direction and the positive x-direction) of sensor assembly 370. First IR sensor 380 may be centered between the left and right side (e.g., along the x-axis) and near the top (e.g., in the positive z-direction) of a sensor boundary 381. Second IR sensor 382 may be located in a lower-left corner (e.g., in the negative z-direction and the negative x-direction) of sensor boundary 381. Third IR sensor 384 may be located in a lower-right corner (e.g., in the negative z-direction and the positive x-direction) of sensor boundary 381.

Similar to sensor assembly 300, controller 232 may control a timing sequence of IR emitters 372, 374, 376 and receive signals from IR sensors 380, 382, 384. In various embodiments, controller 232 may determine a directionality of movement based on the timing sequence of IR emitters 372, 374, 376 and the signals received from IR sensors 380, 382, 384. In various embodiments, the signals sent by IR sensors 380, 382, 384 may indicate an intensity of the IR reflection received.

Figure 4:
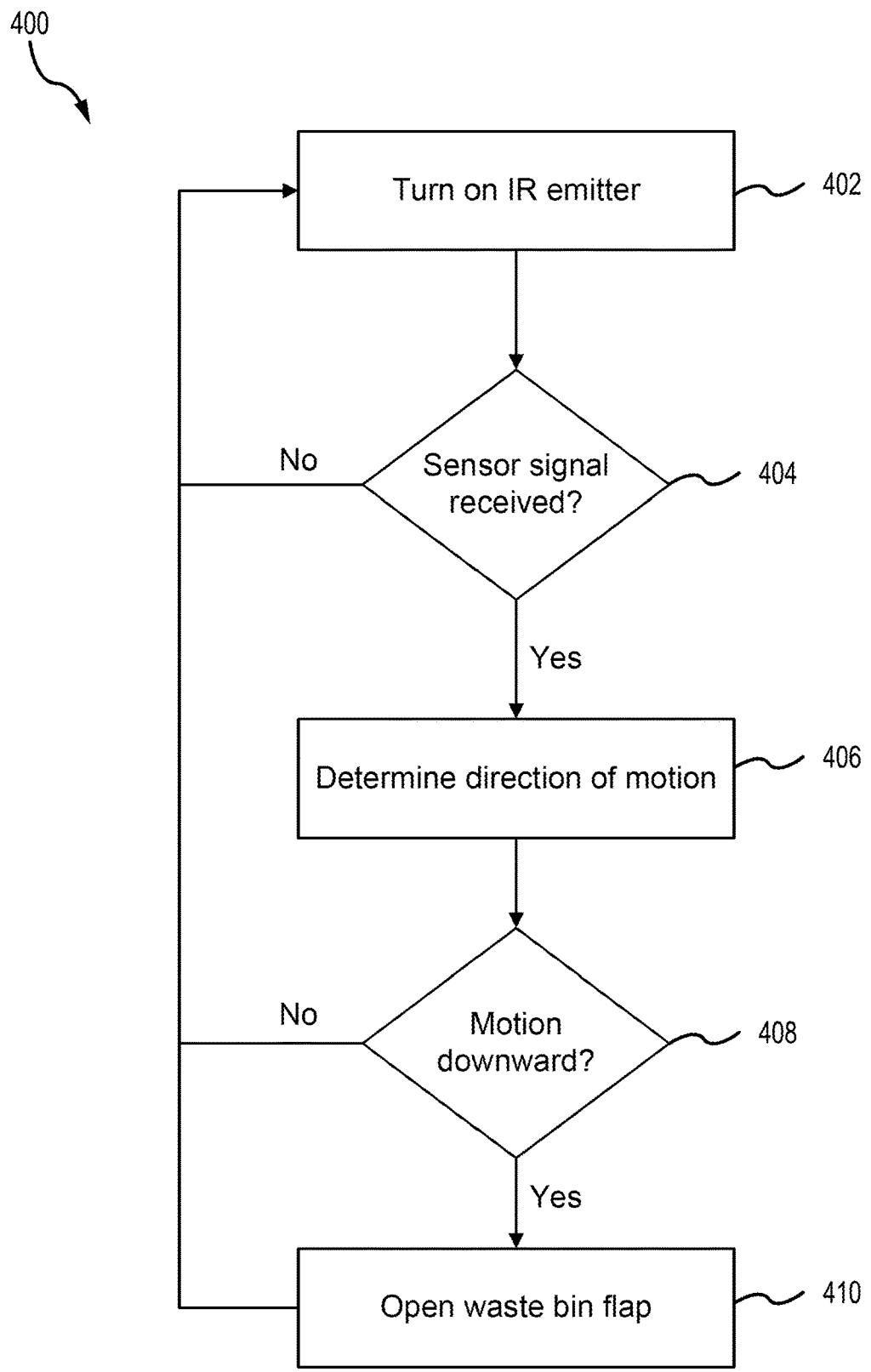
FIG. 4 illustrates a flow diagram for controlling actuation of a waste bin flap in a lavatory, in accordance with various embodiments.

Referring now to FIG. 4, a method 400 of actuating a waste bin flap is illustrated, in accordance with various embodiments. In various embodiments, method 400 may be performed by controller 232 and sensor assembly 208, 258 in waste bin flap actuation system 200 or waste bin flap actuation system 250 described above in FIGS. 2A-2C. In various embodiments, sensor assembly 208, 258 may be an example of sensor assembly 300, 330, 350, 370 described above in FIGS. 3A-3C.

At block 402, controller 232 turns on an infrared (IR) emitter. In various embodiments, the IR emitter may be an example of IR emitters 302, 304, 306, 308 described above with respect to FIG. 3A. In various embodiments, the IR emitter may include a plurality of IR emitters. In various embodiments, each of the plurality of IR emitters may be controlled independently of the other IR emitters.

At decision block 404, controller 232 determines whether sensor assembly 208 transmitted a signal indicating motion. If it is determined that sensor assembly 208 has not transmitted a signal indicating motion, method 400 returns to block 402 to continue activating the IR emitter. If instead, it is determined that sensor assembly 208 transmitted a signal indicating motion, method 400 proceeds to block 406.

At block 406, controller 232 determines a direction of motion based on the signal received from sensor assembly 208. In various embodiments, controller 232 may be able to distinguish between downward motion (e.g., top to bottom in a negative z-direction) and other directions of motion. In various embodiments, controller 232 may be able to distinguish between discrete directions of motion (e.g., left, right, upward, downward). In various embodiments, controller 232 may be able to distinguish a depth of motion (e.g., toward wall 206 in FIG. 2B).

At decision block 408, controller 232 determines whether the motion is downward. If it is determined that the motion is not downward, method 400 returns to block 402 to continue activating the IR emitter. If instead, it is determined that the motion is downward, method 400 proceeds to block 410.

At block 410, controller 232 sends a signal to actuator 230 to open flap 204. Method 400 then returns to block 402 to continue activating the IR emitter.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C. B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 5% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 5% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above-described concepts can be used alone or in combination with any or all of the other above-described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A waste bin actuation system, comprising:
   a wall including an opening;
   a waste bin disposed behind the wall;
   a flap disposed within the opening and configured to provide access to the waste bin;
   an actuator coupled to the flap;
   a sensor assembly disposed in the wall, the sensor assembly including a first emitter, a first sensor, and a second sensor;
   a processor operatively coupled to the actuator and the sensor assembly; and
   a memory operatively coupled to the processor, the memory comprising instructions stored thereon that, when executed by the processor, cause the processor to:
      activate the first emitter to transmit an infrared light onto a moving object;
      receive a first signal from the first sensor;
      receive a second signal from the second sensor; and
      activate the actuator in response to receiving the first signal before the second signal.

2. The waste bin actuation system of claim 1, wherein the first signal indicates a first amount of infrared reflection from an object, wherein the second signal indicates a second amount of infrared reflection from the object, and wherein the instructions, when executed by the processor, further cause the processor to:
   determine a first amount of infrared light based on the first signal;
   determine a second amount of infrared light based on the second signal;
   determine that the object is moving in a first direction based at least in part on the first amount of infrared light and the second amount of infrared light; and
   activate the actuator in response to the object moving in the first direction.

3. The waste bin actuation system of claim 2, wherein the sensor assembly further includes a second emitter, wherein the instructions, when executed by the processor, further cause the processor to:
   alternately activate the first emitter and the second emitter; and
   determine that the motion is in the first direction based at least in part on the first emitter being activated.

4. The waste bin actuation system of claim 2, wherein the sensor assembly is angled away from the wall, and wherein the instructions, when executed by the processor, further cause the processor to:
   activate the actuator in response to the first amount of infrared light being within a predetermined amount of the second amount of infrared light, indicating in a second direction that is angled toward the sensor assembly with respect to the first direction.

5. The waste bin actuation system of claim 1, wherein the first sensor is disposed above the second sensor.

6. The waste bin actuation system of claim 5, wherein the first signal being received before the second signal indicates a downward motion from the first sensor to the second sensor.

* * * * *